United States Patent [19]

Cheng et al.

[11] 4,420,318
[45] Dec. 13, 1983

[54] VACUUM FREEZING PROCESS WITH MULTIPLE PHASE TRANSFORMATIONS OF LOW PRESSURE VAPOR

[76] Inventors: Chen-Yen Cheng; Sing-Wang Cheng, both of 9605 La Playa St., NE., Albuquerque, N. Mex. 87111

[21] Appl. No.: 315,858

[22] Filed: Oct. 28, 1981

[51] Int. Cl.$^3$ ............................................... B01D 9/04
[52] U.S. Cl. ...................................................... 62/542
[58] Field of Search ..................... 62/592, 591; 159/45, 159/DIG. 23, DIG. 16; 55/82; 422/244; 23/294 R; 165/2, 61

[56] References Cited

U.S. PATENT DOCUMENTS 4,236,382 12/1980 Cheng et al. ............................ 62/537
4,252,772 2/1981 Way ...................................... 422/244

Primary Examiner—Hiram H. Bernstein

[57] ABSTRACT

The Vacuum Freezing Vapor Desublimation Desublimate Vaporization Process (denoted as VDDV Process) is an improved vacuum freezing process that is useful in separating solvent from a solution that contains one or more non-volatile solutes. It can be used in desalination of sea water and brackish water, renovation of waste water, and concentration of aqueous and non-aqueous solutions.

Referring to sea water desalination, the process comprises the following steps: (a) feed sea water is flash vaporized under a reduced pressure to thereby form a first low pressure water vapor (3.5 torr) and an ice-brine slush; (b) the first low pressure water vapor is cooled without pressurization to form a mass of desublimate; (c) the ice-brine slush is separated into a mass of purified ice and a concentrated brine; (d) the desublimate is melted and vaporized to form a second low pressure water vapor that is at a pressure higher than the triple point pressure of water (4.58 torr); (d) the second low pressure water vapor is brought in contact with the purified ice to thereby condense the vapor and melt the ice. Both the condensate and the melt become product fresh water. The characteristic feature of the process is that a low pressure vapor is pressurized from a first pressure that is lower than the triple point pressure to a second pressure that is higher than the triple point pressure by first desubliming the vapor and then melting and vaporizing the desublimate. The need of a low pressure compressor has been eliminated.

16 Claims, 17 Drawing Figures

Vapor Processing Conduit for Desublimation – Melting – Vaporization

Desublimation of Low Pressure Vapor

Fig. 6-c — Desublimate

Melting of Desublimate

Vaporization of the Melt

VACUUM FREEZING PROCESS WITH MULTIPLE PHASE TRANSFORMATIONS OF LOW PRESSURE VAPOR

BACKGROUND OF THE INVENTION

1. Field of Invention

The process of the present invention is an improved vacuum freezing process that is useful in separating solvent from a solution that contains one or more non-volatile solutes. It can be used in desalination of sea water and brackish water, renovation of waste water, and concentration of aqueous and non-aqueous solutions.

The major difficulties that a conventional vacuum freezing process has suffered from are related to the way the low pressure water vapor formed in a vacuum freezing zone is removed from the zone and the way it is transformed into a liquid state. The present invention introduces a new and convenient method of accomplishing these without using a compressor to compress the vapor, without using an absorbing solution to absorb the vapor and without pressurizing ice. In the process, the low pressure vapor is desublimed without pressurization and the desublimate is then melted and vaporized to form a vapor that is at a pressure higher than the triple point pressure. The process is highly energy efficient and can be operated simply and reliably.

2. Brief Description of the Prior Art

Several vacuum freezing processes have been introduced by workers in the desalination field. These processes are (1) Vacuum-Freezing Vapor-Compression (VFVC) Process developed by Colt Industries, (2) Vacuum-Freezing Vapor Absorption (VFVA) Process developed by Carrier Coporation, (3) Vacuum-Freezing Ejector-Absorption (VFEA) Process developed by Colt Industries, (4) Vacuum-Freezing Solid-Condensation (VFSC) Process developed in the Catholic University of America (5) Absorption Freezing Vapor Compression (AFVC) Process introduced by Concentration Specialists, Inc., and (b) Vacuum Freezing High Pressure Ice Melting (VFPIM) Process introduced by Chen-Yen Cheng and Sing-Wang Cheng.

In any of the vacuum freezing processes described, an aqueous solution is introduced into a chamber which is maintained at a pressure that is somewhat lower than the vapor pressure of the solution at the freezing temperature of the solution to thereby simultaneously flash vaporize water and form ice crystals. As the results of this operation, a low pressure water vapor and an ice-mother liquor slurry are formed. In case of sea water desalination, this pressure is around 3.5 Torr. The low pressure water vapor formed has to be removed and transformed into a condensed state; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes described utilize different ways of vapor removal, different ways of transforming the vapor into condensed states and different ways of accomplishing the heat reuse.

The Vacuum Freezing Vapor Compression Process is described in the Office of Saline Water, Research and Development Report No. 295. In the process, the low pressure water vapor is compressed to a pressure higher than the triple point pressure of water (4.58 Torr) and is then brought in direct contact with purified ice to thereby simultaneously condense the water vapor and melt the ice. The main disadvantages of this process are that the special compressor designed to compress the low pressure water vapor can not be operated reliably and the compressor efficiency is low.

The Vacuum Freezing Vapor Absorption Process was developed by Carrier Corporation up to 1964, but has been discontinued. The process is described in the Office of Saline Water, Research and Development Report No. 113. In the process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals.

The Vacuum Freezing Ejector absorption Process was also developed by Colt Industries and is described in Office of Saline Water, Research and Development Report No. 744. In the process, the low pressure water vapor obtained in the freezing step is compressed by a combination of steam ejector and absorber loop. A concentrated sodium hydroxide solution is used to absorb a part of the low pressure vapor, the diluted sodium hydroxide solution is boiled to form water vapor at 300 Torr and regenerate the concentrated solution. In the ejector the water vapor at 300 Torr is used to compress the remaining low pressure water vapor.

The Vacuum-Freezing Solid-Condensation Process was developed by Professors H. M. Curran and C. P. Howard of the Catholic University of America and is described in Office of Saline Water, Research and Development Report No. 511. In the process, Freon-12 is used to remove the latent heat released in transforming the low pressure vapor into ice and supply the latent heat needed in the melting of both the ice formed in the freezing step and ice transformed from the low pressure water vapor.

The Absorption Freezing Vapor Compression (AFVC) Process has been recently introduced by Concentration Specialists, Inc., Andover, Mass. and a 25,000 gpd pilot plant has been built in OWRT (Office of Water Research and Technology) Wrightsville Beach Test Station. The absorption freezing vapor compression (FAVC) Process is a vacuum freezing process in which the freezing is accomplished in a stirred tank crystallizer due to the evaporation of water vapor which in turn is absorbed in an adjacent chamber by a concentrated solution of sodium chloride (NaCl). The NaCl solution, diluted by the water vapor, is pumped to a generator where it is concentrated to its original strength by a vapor compression cycle using a closed circuit refrigerant as the working fluid. The vapor compression cycle operates between the absorber and generator, taking the heat that is associated with absorption and pumping it up to a level such that it can be used to evaporate the absorbate in the generator. The vapor liberated in the generator is used to melt the ice in direct contact.

In the Improved Vacuum-Freezing High Pressure Ice Melting Process of U.S. Pat. No. 4,236,382, an aqueous solution is flash vaporized under a reduced pressure to simultaneously form a low pressure water vapor and ice crystals. The ice formed is first purified in a counter-washer and then melted inside of heat conductive conduits under a high pressure (e.g. 600 atm.) and the low pressure water vapor is desublimed to form desublimate (ice) on the outside of the conduits. The latent heat of desublimation released is utilized in supplying the heat needed in the ice-melting operation. The desublimate is removed intermittently by an in-situ dissolution operation utilizing an aqueous solution such as the feed solution or the concentrate; about an equivalent amount amount of ice is formed inside of the conduits by an exchange freezing operation. The ice so formed is also melted by the high pressure ice melting operation described.

BRIEF DESCRIPTION OF THE INVENTION

The Vacuum Freezing Vapor Desublimation Desublimate Vaporization Process is a separation process that incorporates a unique way of transforming a first vapor of the solvent at a pressure lower than its triple point pressure to a second vapor at a pressure higher than the triple point pressure. The pressurization of the vapor is accomplished by (1) desubliming the first vapor, (2) melting the desublimate, and (3) vaporization the melt. The process can be used in separating the solvent from an aqueous solution or a non-aqueous solution containing one or more low volatility solutes. Examples are: desalination of sea water and brackish water; concentrating industrial aqueous solutions, such as sugar solutions, caustic solutions, and acid solutions; separations of solvents from organic solutions, such as those obtained in extraction processes. The process can also be used in conditioning a mixture by freezing and thawing operations, such as in conditioning an aqueous sludge to facilitate dewatering the sludge.

In most applications, a separation process of the present invention comprises the following steps: (a) simultaneous flash vaporization and crystallization to form a first vapor and a mass of solvent crystals, the pressure of the first vapor being lower than the triple point pressure of the solvent, and the crystals and the liquid forming a slush denoted as a first condensed mass (Step 1); (b) separating the first condensed mass into a mass of purified solvent solid and a mother liquor (Step 2); (c) desubliming the first vapor without pressurization to form a mass of desublimate (Step 3); (d) melting the desublimate (Step 4-a) and vaporizing the melt (Step 4-b) to form a second vapor, whose pressure is higher than the triple point pressure (Step 4); (e) contacting the second vapor with the purified solvent crystals to thereby melt the crystals and condense the vapor (Step 5). The mother liquor separated in the second step is the concentrate and the condensate and melt obtained in step 5 become purified solvent.

It has been described that the process may be used to condition a sludge for dewatering by freezing and thawing the sludge. In such an application, the first step is so conducted that the first condensed mass becomes a nearly completely frozen sludge, the second step is omitted and the second vapor is contacted with the frozen sludge in Step 5 to thaw the sludge. A sludge conditioned by freezing and thawing operations can be dewatered by a filtration operation. Desublimation of the first vapor (Step 3) and melting of the desublimate (Step 4-a) and vaporization of the melt (Step 4-b) are conducted cyclically on the outside wall of a heat conductive conduit. A working medium may be vaporized under a low pressure $(P_M)_1$ to remove latent heat of desublimation in Step 3 and the medium vapor may be condensed under high pressures $(P_M)_2$ and $(P_M)_3$ to supply latent heat of melting of the desublimate and latent heat of vaporizing the melt. Each conduit is provided with a trough under it in order to store the melt that is formed in Step 4-a in the vicinity of the conduit and is also provided with a wicking means to supply the melt throughout the outer wall of the conduit during Step 4-b. Such a wicking device may be circumferential grooves provided on the outer wall or a coating of sintered metal or a wire screen or other wicking means used in manufacturing heat pipes.

BRIEF DESCRIPTION OF THE DRAWINGS

FIGS. 1-a and 1-b illustrate a system in which a process of the present invention may be conducted. Such a system comprises a vacuum freezing zone (Zone 1), a melting zone (Zone 2) and a vapor processing zone (Zone 3) which may be made up of more than one sub-zones. Two vapor processing sub-zones are shown in the figures. Simultaneous flash vaporization and crystallization operations (Step 1) are conducted in the vacuum freezing zone; desublimation of the low pressure vapor (Step 3) and melting of the desublimate and vaporization of the melt (Step 4) are conducted cyclically in each of the vapor processing sub-zone; condensation of the second vapor and melting of solvent crystals are conducted in the melting zone.

FIG. 4 illustrates a processing system and a flow sheet of a separation process of the present invention. It shows a vacuum freezing zone, two vapor processing sub-zones, a melting zone and a purification zone for purifying solvent crystals. Each operational steps will be described by referring to this Figure.

FIG. 5-a illustrates the structure of a vapor processing unit used in a vapor processing zone. The unit comprises a heat conductive conduit, a trough installed under the heat conductive conduit and a wicking means provided at the outer wall of the conduit. FIG. 5-b shows a view of the unit in the direction perpendicular to the longitudinal direction of the unit. The trough and wicking means are used to store the melt in the vicinity of the conduit and supply the melt to the outer wall in Step 4-a and 4-b respectively.

FIGS. 6-a through 6-c illustrate the progress of a vapor desublimation step (Step 3) conducted on a vapor processing unit; FIGS. 7-a through 7-c illustrate the progress of melting a desublimate conducted on a vapor processing unit (Step 4-a); FIGS. 8-a through 8-c illustrate the progress of vaporizing the melt conducted on a vapor processing unit (Step 4-b).

DESCRIPTION OF PREFERRED EMBODIMENT OF THE INVENTION

The Vacuum Freezing Vapor Desublimation Desublimate Vaporization Process is used to separate a mixture containing a volatile solvent and one or more low volatility solutes into a solvent rich portion and a solvent lean portion and is also used simply to condition a mixture such as a sludge by freezing and thawing operations. In the process, a feed mixture is flash vaporized under a reduced pressure to simultaneously form solvent crystals. The feed is thereby transformed into a solvent enriched vapor (first vapor) whose pressure is lower than the triple point pressure of the solvent and a first condensed mass that contains the solvent crystals. The process incorporates a unique way of transforming the first vapor to a second vapor whose pressure is higher than the triple point pressure of the solvent. The transformation is accomplished by (1) desubliming the first vapor to form a mass of desublimate, (2) melting the desublimate to form a melt and (3) vaporizing the melt to form the second vapor. The second vapor is then brought in contact with the solvent crystals to thereby condense the vapor and melt the crystals.

Figure 1:
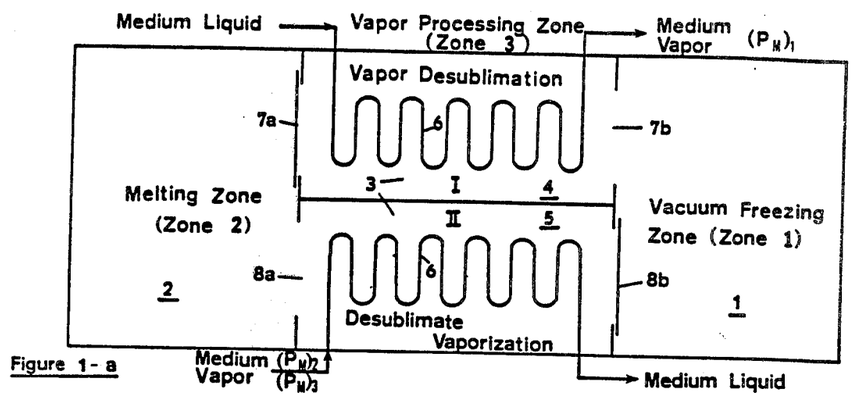
Figure 4:
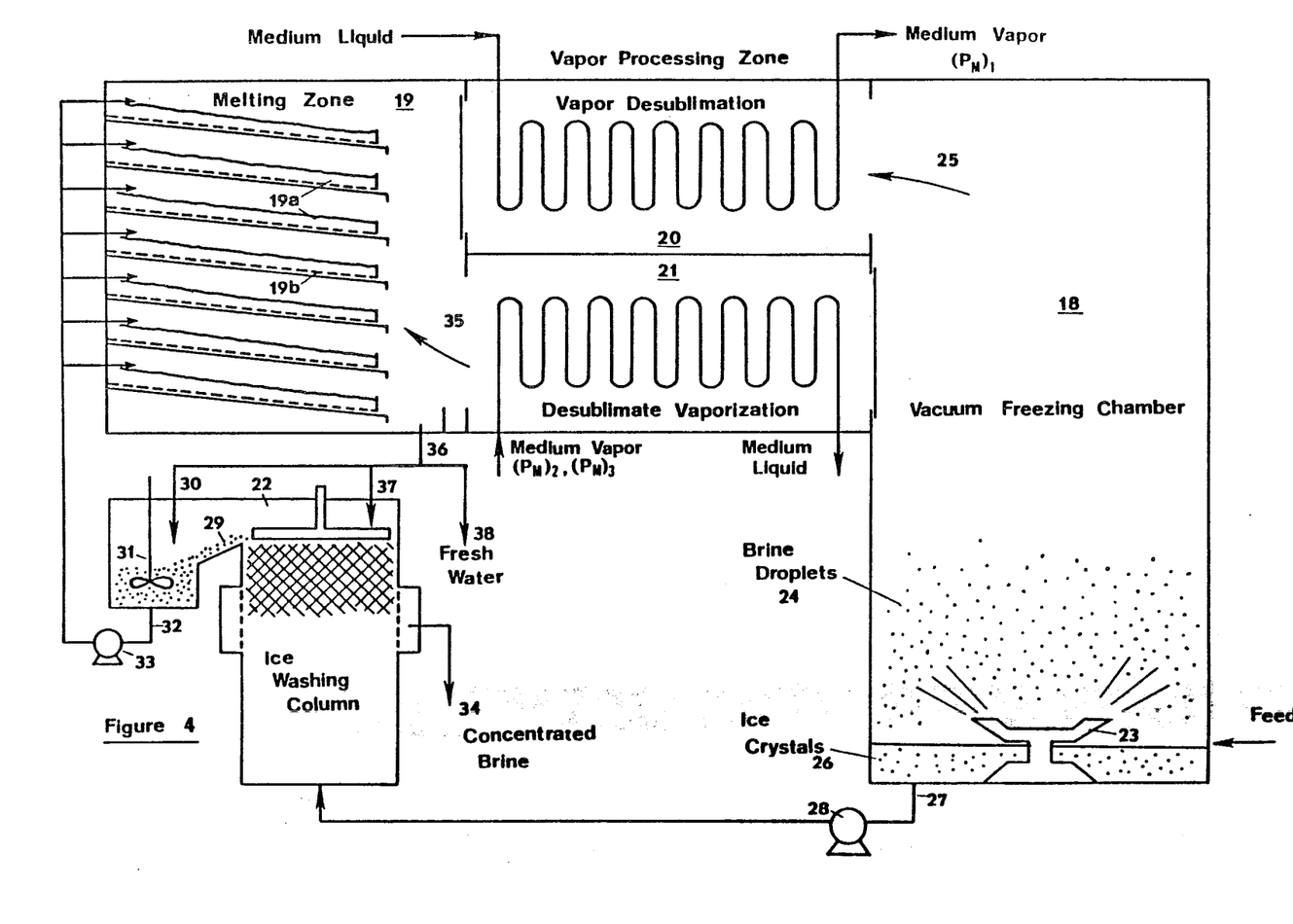
Figure 9:
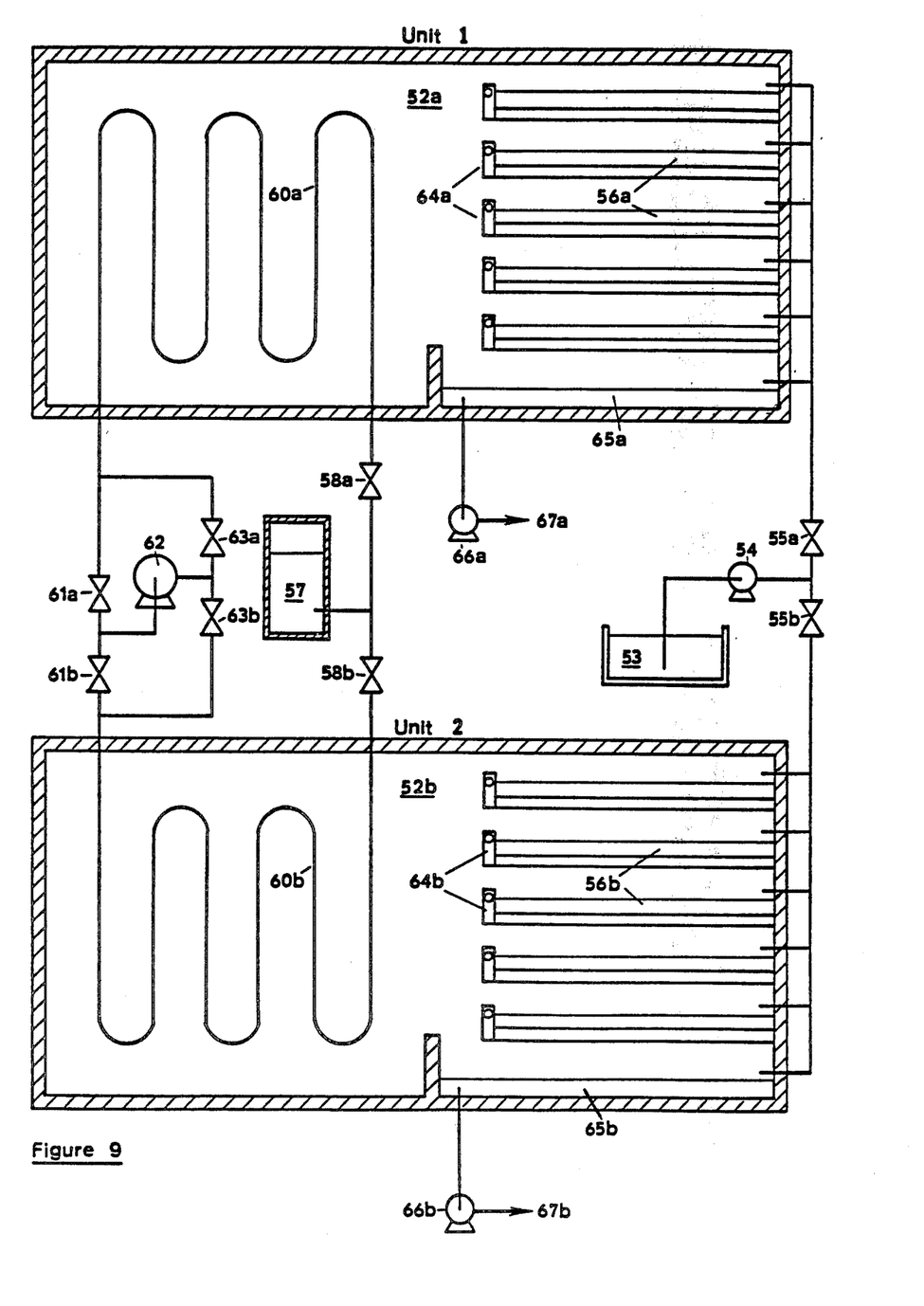
FIG. 9 illustrates a system in which a sludge may be conditioned by freezing and thawing operations. Since there is no need to separate solvent crystals from the mother liquor, in-situ freezing and thawing operations can be used and operational procedures and the equipment used are simplified substantially.

There are two types of processes: in a Type 1 process, there is a step of separating the first condensed mass into purified solvent crystals and mother liquor (i.e. concentrate); in a Type 2 process, the step described is omitted. Type 1 processes are used in desalination of sea water and brackish water; concentrations of industrial aqueous solutions, such as sugar solutions, caustic solutions and acid solutions; separations of organic solutions, such as those obtained in extraction processes. Type 2 processes are used in conditioning of mixtures by freezing and thawing operations, such as in conditioning of gels and sludges to facilitate dewatering. FIGS. 1-a, 1-b illustrate a general system in thich both Type 1 and Type 2 processes can be conducted; FIG. 4 illustrates a system in which a Type 1 process can be conducted; FIG. 9 illustrates a system in which a Type 2 process can be conducted.

A Type 1 process comprises the following five steps:

Step 1: Vacuum Crystallization

A feed mixture is flash vaporized under a reduced pressure to simultaneously form solvent crystals. The feed mixture is thereby transformed into a solvent enriched first vapor and a first condensed mass that contains the solvent crystals. The pressure of the first vapor is lower than the triple point pressure of the solvent.

Step 2: Crystal Purification

The first condensed mass obtained in Step 1 is separated and washed to give a mass of purified solvent crystals and a mother liquor. The mother liquor is heat exchanged and becomes a product (concentrate).

Step 3: Vapor Desublimation

The first vapor formed in Step 1 is cooled without a substantial pressurization by passing a cooling medium through vapor processing conduits to be described. Since the vapor is substantially pure solvent and since the pressure is lower than the triple point pressure of the solvent, it desublimes to form a mass of desublimate on the vapor processing conduits.

Step 4: Desublimate Vaporization

This step comprises two sub-steps: i.e. desublimate melting step (step 4a) and melt vaporization step (step 4b). These sub-steps are conducted by passing a heating medium through the vapor processing conduits. The conduits are so constructed that the melt formed stay in the vicinity of the conduits and the melt is supplied to the outer walls of the conduits during the melt vaporization sub-step by a wicking mechanism. The desublimate is thereby transformed into a second vapor that is at a pressure higher than the triple point pressure of the solvent.

Step 5: Crystal Melting

In this step, the second vapor formed in Step 4 is brought in contact with the purified solvent crystals obtained in Step 2. Since the pressure of the second vapor is higher than the triple point pressure of the solvent, it condenses at a temperature higher than the triple point temperature and melts the solvent crystals. Both the condensate and the melt become purified solvent.

In a Type 2 process, Step 2 described is omitted and, in Step 5, the second vapor is contacted with the first condensed mass obtained in Step 1 to thereby condense the vapor and thaw the first condensed mass.

FIGS. 1-a and 1-b illustrate a system in which either a Type 1 process or a Type 2 process may be conducted. The system comprises a vacuum freezing zone (zone 1) 1 a melting zone (zone 2) 2, and a vapor processing zone (zone 3) 3 which may be made up of more than one sub-zones 4, 5. Two vapor processing sub-zones are shown in the figures. Each of these sub-zones contains multitude of vapor processing conduits 6 (FIGS. 5-a and 5-b) to be described and is alternately used for vapor desublimation and desublimate vaporization operations. The vacuum freezing step (Step 1) is conducted in the vacuum freezing zone (zone 1); desublimation of the first vapor (Step 3) and vaporization of the desublimate (Step 4) are conducted cyclically in each of the vapor processing sub-zone; condensation of the second vapor and melting of solvent crystals or the first condensed mass are conducted in the melting zne (zone 2). The first vapor processing sub-zone 4 is provided with two gates 7a, 7b; the second vapor processing sub-zone 5 is also provided with two gates 8a and 8b. An equipment used in the crystal purification step is not shown in the figures.

The operations conducted in the first vapor processing sub-zone are explained as follows:

(1) Vapor Desublimation Step (Step 3)

Referring to FIG. 1-a, during this step, gate 7a is closed and gate 7b is open to allow the first vapor formed in Zone 1 to enter the sub-zone and isolate the sub-zone from Zone 2. A working medium liquid is vaporized in the vapor processing conduits 6 under pressure $(P_M)_1$ to cool the first vapor and form a mass of desublimate on the conduits.

(2) Desublimate Melting Sub-step (4-a)

During this step, both gates 7a and 7b are closed and a working medium vapor is condensed in the vapor processing conduits 6 at pressure $(P_M)_2$ to thereby melt the desublimate and form a melt. The melt is kept near the conduits. As the desublimate melts, the pressure in the space outside of the conduits rise to or above the triple point pressure of the solvent. Therefore, gate 7b has to be closed to prevent solvent vapor from flowing from the sub-zone to Zone-1. When both gates 7a and 7b are closed, the sub-zone is isolated and the pressure tends to rise above the triple point pressure of the solvent. This pressure rise increases the rate of melting the desublimate.

(3) Melt Vaporization Sub-step (Step 4b)

Referring to FIG. 1b, during this step, gate 7a is open and gate 7b is closed and a working medium vapor is condensed in the vapor processing conduits 6 at pressure $(P_M)_3$ to thereby vaporize the melt formed in Step 4a. The melt is supplied to the outer walls of the conduits by a wicking mechanism or a pumping operation. The melt is thereby transformed into a second vapor whose pressure is higher than the triple point pressure of the solvent. The second vapor enters the melting zone to be condensed and melt the solvent crystals therein. The operations conducted in the second vapor processing sub-zone are similar to those described.

Figure 2:
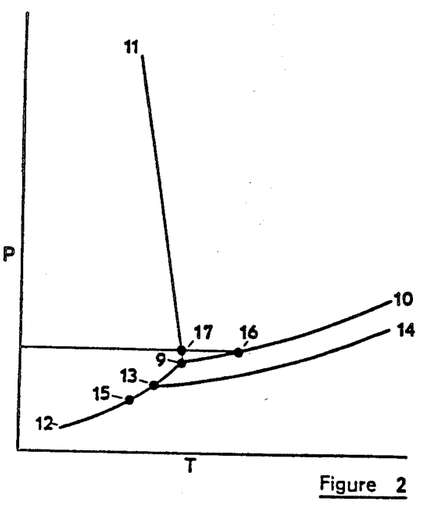
FIG. 2 illustrates the phase behaviors of water and an aqueous solution and illustrates conditions under which the steps of processing the aqueous solution are conducted.
Figure 3:
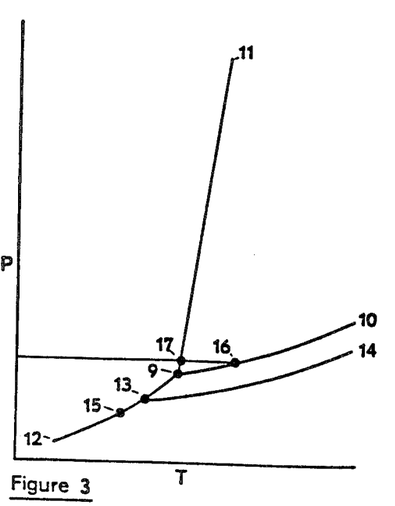
Fig. 3 illustrates the phase behaviors of a non-aqueous solvent and a non-aqueous solution and illustrates conditions under which the steps of processing the non-aqueous solution are conducted.

The operating conditions for the steps described are explained by referring to the phase diagrams illustrated by FIGS. 2 and 3. FIG. 2 illustrates the phase behaviors of water and an aqueous solution. It shows the triple point of water 9 (0.01° C., 4.58 Torr.), vaporization line 9–10, melting line 9–11 and sublimation line 9–12. The vapor pressure line of an aqueous solution containing one or more non-volatile solutes is shown by line 13–14. The three phase point representing the condition under which three phases, ice, water vapor and the aqueous solution, co-exit and attain equilibrium is shown as point 13. Referring to FIGS. 1-a, 1-b and 2, let the concentration of the solution in the freezer be such that its vapor pressure curve be represented by line 13–14, then the first vapor leaving the vacuum freezing zone is at a pressure somewhat lower than the pressure at the three phase point 13. This vapor then enters a vapor processing sub-zone and is cooled and becomes desublimate on the vapor processing conduits at a pressure 15 which is lower than that of the three phase pressure 13. The desublimate is melted and vaporized; the second vapor so formed is at a pressure 16 that is higher than the triple point pressure 9 of the solvent. The melting temperature of purified solvent crystals is represented by point 17. When the second vapor is brought in contact with the solvent crystals, heat transfers from the vapor to the solid so that condensation of the vapor and melting of solid take place simultaneously. Both the melt and the condensate become product fresh water. FIG. 3 illustrates the phase behaviors of a non-aqueous solvent and a solution of the solvent and one or more low volatility solutes. The operational steps used in separating a non-aqueous solution are similar to those described for the aqueous solution. Therefore, a description of them is omitted.

FIG. 4 illustrates a system for conducting a Type 1 process, such as sea water desalination. The system comprises a vacuum freezing chamber 18, a melting chamber 19, vapor processing chambers 20, 21, and an ice washing column 22. Feed solution is precooled by heat exchanging with product streams and is introduced into the vacuum freezing chamber. An agitating spraying device 23 throws brine into space as brine droplets 24 to thereby form a first vapor 25 and ice crystals 26. Similar operation has been used by Colt Industries and Concentration Specialists. One may also use an extended surface freezer that has been developed in the Laboratory of one of the applicants in the University of New Mexico. The feed is thereby transformed into the first vapor 25 and a slush 27 (the first condensed mass) containing ice crystals and mother liquor.

The ice-brine slush 27 is transferred from the vacuum freezer 18 to the ice washing column 22 by a pump 28. The operation of an ice washing column is described in the Office of Saline Water, Research and Development Report No. 295. Similar washing columns can be used in purifying other solvent crystals. Other types of crystal washing equipments are described in the book entitled "Fractional Solidification" edited by Zief and Wilcox and published by Dekker Co. Purified crystals 29 are harvested at the top of the washing column. Some fresh water 30 is added to the purified crystals and agitated by an agitator 31 to form an ice-water slurry 32 and the slurry is transferred by a pump 33 to the melter chamber 19. Concentrated brine 34 is discharged from the washing column and is heat exchanged with feed and becomes a product stream.

The first vapor 25 enters the vapor processing chambers 20, 21, and is desublimed to form a mass of desublimate; the desublimate is melted to form a melt mass; the melt mass is vaporized to form a second vapor 35. These operations have been described earlier by referring to FIGS. 1-a and 1-b. Since these operations are characteristic features of the present invention, more detail descriptions of these operations ar given later by referring to FIGS. 5 through 8.

The ice-water slurry 32 and the second vapor 35 are introduced into the melting chamber. The vapor interacts with the ice. Several melter trays 19a may be installed in the melter and screens may be installed on the trays to allow water to drain out of the melter trays. In this way, the second vapor has a better access to solvent crystals and the rate of melting is enhanced. As the results, the vapor is condensed and the ice is melted. Fresh water 36 is discharged from the melting chamber. A part of this fresh water 37 is used in the ice washing column, a part of the fresh water 30 is added to the purified ice to form the ice-water slurry 32, and the rest 38 becomes product fresh water. The product water is heat exchanged with feed and becomes product fresh water.

Figure 5:
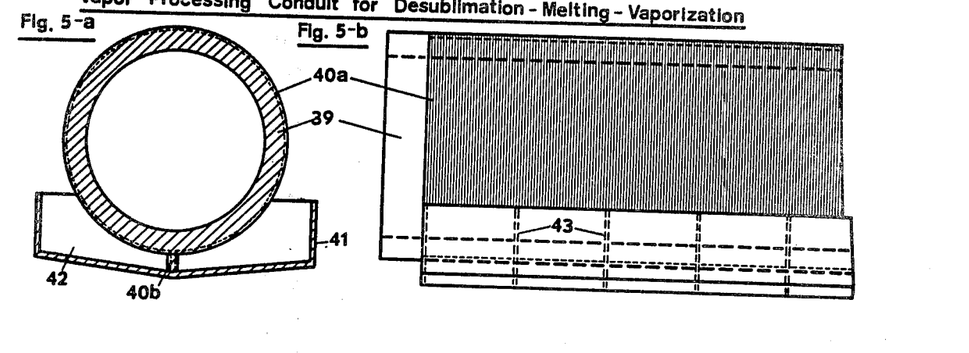

As has been described, the first vapor is transformed into the second vapor by interacting with working mediums through the vapor processing conduits. The vapor processing steps are (1) desublimation of the first vapor, (2) melting of the desublimate and (3) vaporization of the melt. When a storage region is not provided near a vapor processing conduit, the melt formed in the melting step drips away from the conduit. Then, it is necessary to apply the melt on the conduit surface during a melt vaporization step. A plant can be operated in this way. However, it is more convenient to use an integrated vapor processing conduit that is provided with a melt storage near the conduit and a wick structure for feeding the melt on the outer wall during the melt vaporization step. Such an integrated conduit is illustrated by FIGS. 5-a and 5-b. The desublimation step, the melting step and the melt vaporization step that are conducted on an integrated vapor processing conduit are illustrated by FIGS. 6-a through 6-c, FIGS. 7-a through 7c and FIGS. 8a through 8c respectively.

FIG. 5-a and FIG. 5-b respectively illustrate a radial cross section and a side view of an integrated vapor processing conduit. It comprises a conduit 39 provided with a wicking structure 40a and a melt storage trough 41 that stores the melt 42. The region between the conduit and the trough may be separated into conpartments by partitions 43. A thin layer of melt is maintained on the outer wall of the conduit during melting and vaporization steps by the action of the wicking structure. Many types of wick structures and many materials have been used in manufacturing heat pipes. Such structures and materials are described in books on heat pipes, such as "Heat Pipe Theory and Practice", written by S. W. Chi and published by Mc Graw-Hill Company and "Heat Pipes" written by P. Dunn and D. A. Reay and published by Pergamon Press. Wick structures and materials used in heat pipes can be used in the manufacture of integrated vapor processing conduits. The purpose of the wick structure in a vapor processing conduit are threefold: (i) to provide the necessary flow passages for transferring melt from the storage to all over the outer wall of the conduit, (ii) to provide surface pores at the liquid-vapor interface for the development of capillary pumping pressure, and (iii) to provide a heat flow path from the outer wall to the liquid-vapor interface. Some examples of wick structures are wrapped screen, sintered metal, circumferential grooves and screen covered circumferential grooves and fabric and paper.

Figure 6:
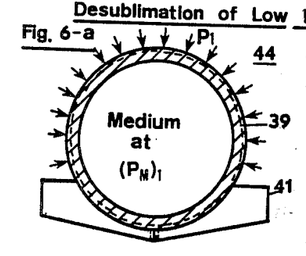

FIGS. 6-a through 6-c illustrate the progress of a desublimation step. During this step, a first vapor 44 is brought in contact of the outer wall of the conduit 39 at pressure $P_1$. A working medium undergoes an endothermic transformation within the conduit to remove the latent heat of desublimation. When the medium used is a solidification-melting type medium (denoted as S/L medium), the transformation is melting under pressure $(P_M)_1$. When the medium used is a vaporization-condensation type medium (denoted as L/V medium), the transformation is vaporization under pressure $(P_M)_1$. One may also use an endothermic chemical reaction to remove the latent heat of desublimation. As the result, a layer of desublimate 45 is formed on the conduit.

Figure 7:
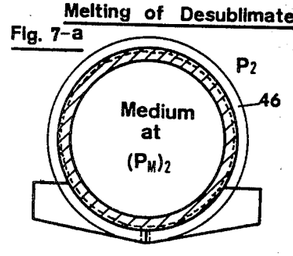

FIGS. 7-a through 7-c illustrate the progress of a desublimate melting step. During this step, the vapor processing sub-zone is isolated from the vacuum freezing zone and the melting zone and a working medium undergoes an exothermic transformation within the conduit to supply the latent heat of melting the desublimate. When the medium used is a solidification melting type medium, the transformation is solidification at pressure $(P_M)_2$; when the medium used is a vaporization-condensation type medium, the transformation is condensation at pressure $(P_M)_2$. An exothermic chemical reaction may also be used. During this step, the pressure in the processing zone rises to a pressure $P_2$ which is somewhat higher than the triple point pressure of the solvent. Heat transfer to the desublimate may be by direct heat transfer from the wall to the desublimate, by heat transfer through a layer of melt and then to the desublimate, and by vaporization of an amount of melt and an interaction between the vapor and the desublimate. The last mechanism enhances the rate of melting of the desublimate. The desublimate 46 is transformed into melt. Most of the melt 47 is collected in the trough. However, a small amount of the melt is retained even at the top part of the outer wall due to the presence of the wick structure.

Figure 8:
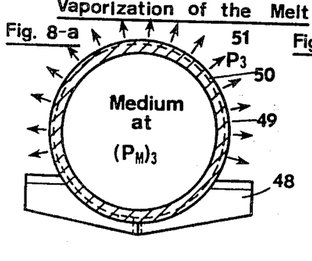

FIGS. 8-a through 8-c illustrate the progress of a melt vaporization step. During this step, the vapor processing sub-zone is isolated from the vacuum freezing zone but is connected to the melting zone and a working medium undergoes an exothermic transformation within the conduit to supply the latent heat of vaporizing the melt. When the medium used is a solidification-melting type medium, the transformation is solidification at pressure $(P_M)_3$; when the medium used is a vaporization-melting type medium, the transformation is condensation at pressure $(P_M)_3$. Again, an exothermic chemical reaction may also be utilized. During this step, melt 48 is transferred from the storage to the outer wall 49 by the wick structure 50 and is vaporized to become the second vapor 51 at a pressure $P_3$ which is somewhat higher than the triple point pressure of the solvent.

In the descriptions given above, it is assumed that each integrated vapor processing conduit is provided with a separate trough for storing the melt. However, it is advantageous to have a row of conduits sharing a common melt storage or even to have several rows of conduits sharing a melt storage. A wick illustrated by 40b is used to connect each conduit to the storage and provide a liquid passage from the storage to the outer wall of the conduit.

FIG. 9 illustrates a system in which a Type 2 process can be conducted. It is noted that, in a Type 2 process, there is no need for a crystal purification step and, in the crystal melting step, the second vapor is contacted with the first condensed mass obtained in the vacuum crystallization step. Because of the omission of the crystal purification step, a region may be alternately used as a vacuum crystallization zone and a melting zone and the first condensed mass obtained in a vacuum crystallization step may be melted in-situ during the next following melting step.

The system illustrated has two units 52a and 52b. While vacuum freezing and vapor desublimation operations (mode 1) are conducted in one unit, desublimate vaporization and crystal melting operations (mode 2) are conducted in the other unit. An L/V type working may be vaporized at pressure $(P_M)_1$ in the vapor processing conduits of one unit and condensed at pressure $(P_M)_2$ and $(P_M)_3$ in the other unit. The operations of Unit 1 are as follows:

A quantity of feed sludge is pumped from storage 53 through a pump 54, then through a valve 55a and introduced on freezer trays 56a and the valve 55a is then closed. A liquid working medium is transferred from a storage 57 through a valve 58a and is vaporized in integrated vapor processing conduits 60a. The unit then enters mode 1 operations. The sludge on the freezer trays flash vaporizes and solvent crystals are formed on the tray. The sludge is transformed into a first vapor and a nearly completely frozen sludge. The first vapor desublimes on the conduits 60a. The medium vapor so formed flows through valve 61a (valve 61b is closed), compressed by a compressor 62, and the compressed medium vapor then flows through valve 63b (valve 63a is closed), and is condensed in the conduits 60b and the condensate is returned to the medium storage 57 through valve 58b. The first unit then enters mode 2 operations. The medium vapor formed in the second unit enters the compressor 62 through valve 61b (valve 61a is closed) and the compressed medium vapor flows into the vapor processing conduits 60a (valve 63b is closed) and is condensed. The medium liquid then returns to the storage through valve 58a. The desublimate on the conduits 60a is melted and the melt is vaporized to form a second vapor. The second vapor comes in contact with the frozen sludge on the trays 56a. The vapor is condensed and the sludge is thawed. The thawed sludge is discharged from the trays by opening the gates 64a provided on the trays. The thawed sludge 65a is removed from the unit by a pump 66a. The frozen and thawed sludge 67a can be dewatered by a filtration operation. Operations conducted in Unit 2 are similar to those of Unit 1.

In the descriptions given so far, it has been assumed that the solute is non-volatile. However, with some modifications, the operational steps described can be applied to a mixture containing a volatile solvent and at least one solute that has a low but substantial volatility. Referring to Type 1 process described, the modification to the process steps are described as follows:

(1) During the vacuum crystallization step (Step 1), the first vapor formed contains a small but substantial amount of the solute.

(2) In Step 3, when the first vapor is cooled without a substantial pressurization, it is transformed into a second condensed mass which contains a major amount of solvent solid (desumblimate) and some liquid (condensate). The liquid contains the solute.

(3) In Step 4, the desublimate is first melted so that the second condensed mass is first transformed into a melt liquid. And then the melt liquid is vaporized to form a second vapor. The second vapor contains a low concentration of the solute.

(4) In Step 5, the second vapor is condensed and the purified solvent crystals are melted. When an indirect contact heat exchange is used, the melt and the condensate become separate product streams. The condensate contains a low concentration of solute. When a direct contact heat exchange is used, the melt and condensate join to form a product that contains a low concentration of solute.

The major product may be the concentrate obtained in the crystal purification step. The low concentration solution obtained in Step 5 may be recycled and reused in the plant.

Examples of such application are concentration an aqueous acetic acid solution and an aqueous caprolactam.

What we claim are as follows:

1. A process of separating a mixture containing a solvent and at least one low volatily solute through the formation of a mass of solvent crystals that comprises a first step of flash vaporizing the mixture under a reduced pressure to simultaneously form solvent crystals and thereby transform the mixture into a first vapor whose pressure is lower than the triple point pressure of the solvent and a first condensed mass that contains the solvent crystals, a second step of cooling the first vapor under a pressure lower than the said triple point pressure to thereby transform the first vapor into a second condensed mass containing a mass of solvent solid, a third step of melting the solvent solid to transform the second condensed mass into a melt liquid, a fourth steps of vaporizing a mass of solvent liquid to thereby form a second vapor whose pressure is slightly higher than the said triple point pressure, and a fifth step of bringing the second vapor and solvent crystals derived from the first condensed mass into a heat exchange relation to thereby condense the second vapor and melt the solvent crystals.

2. A process of claim 1 which further comprises a step of separating the first condensed mass into a mass of purified solvent crystals and concentrate and in the fifth step of which the second vapor is brought into a heat exchange relation with at least a part of the mass of purified solvent crystals to thereby melt the crystals and condenses the second vapor, both the melt and the condensate becoming purified solvent.

3. A process of claim 1, wherein the fifth step is conducted by bringing the second vapor in direct contact with the first condensed mass obtained in the first step.

4. A process of claim 3, wherein the feed is chosen from a group that comprises municipal waste water sludge, an aqueous gelatinous substance, industrial waste sludge and an organic gel.

5. A process of claim 2, wherein the fifth step is conducted by bringing the second vapor in direct contact with a mass containing the purified solvent crystals.

6. A process of claim 1, wherein the solvent of the mixture is water.

7. A process of claim 1, wherein the solvent of the mixture is a non-aqueous solvent.

8. A process of claim 2, wherein the solvent of the mixture is water.

9. A process of claim 2, wherein the solvent of the mixture is a non-aqueous solvent.

10. A process of subjecting a mixture that contains a volatile solvent and at least one low volatility solute to freezing and melting operations, the improvement that comprises processing the mixture in a system that comprises a vacuum freezing zone (Zone 1), a vapor processing zone (Zone 2), a melting zone (Zone 3), a first valving means between zone 1 and zone 2, and a second valving means between zone 2 and zone 3, and conduit means for transporting working mediums in the vapor processing zone for removing heat from the zone and supplying heat to the zone, and the process comprising a first step of flash vaporizing the mixture in Zone 1 while the first valving means and the second valving means are respectively in the open and closed positions to thereby form a first vapor whose pressure is lower than the triple point pressure of the solvent and a first condensed mass containing solvent crystals, a second step of admitting the first vapor into the vapor processing zone and removing heat through the conduit means to thereby transform the first vapor to a second condensed mass containing a mass of solvent solid, a third step of supplying heat to the second condensed mass while both the first valving means and the second valving means are in the closed positions to thereby melt the solvent solid and form a melt liquid, a fourth step of supplying heat to a mass of solvent liquid while the first valving means and the second valving means are respectively in the closed and open positions to thereby vaporize the solvent liquid and form a second vapor whose pressure is higher than the triple point pressure of the solvent and a fifth step of admitting the second vapor and a mass of solvent crystals derived from the first condensed mass in zone 3 and establish a heat exchange relation between them to thereby condense the second vapor and melt the mass of solvent crystals.

11. A process of claim 10 that further comprises a step of separating the first condensed mass into a mass of purified solvent crystals and a mother liquor and subjecting the mass of purified solvent crystals to the melting operation of the said fifth step.

12. A process of claim 10 wherein the solvent of the mixture is water.

13. A process of claim 10 wherein the solvent of the mixture is a non-aqueous solvent.

14. A process of claim 11 wherein the solvent of the mixture is water.

15. A process of claim 11 wherein the solvent of the mixture is a non-aqueous solvent.

16. A process of subjecting a mixture that contains a volatile solvent and at least one low volatility solute to freezing and melting operations, the improvement that comprises processing the mixture in a system that comprises a vacuum freezing-crystal melting zone (Zone 1) and a vapor processing zone (Zone 2), a first valving means between Zone 1 and Zone 2, and conduit means for transporting working mediums in the vapor processing zone for removing heat form the zone and supplying heat to the zone, and the process comprising a first step of flash vaporizing the mixture in Zone 1 while the first valving means is in the open position to thereby form a first vapor whose pressure is lower than the triple point pressure of the solvent and a first condensed mass containing solvent crystals, a second step of admitting the first vapor into the vapor processing zone and removing heat through the conduit means to thereby transform the first vapor to a second condensed mass that contains a mass of solvent solid, a third step of supplying heat to the second condensed mass while the first valving means is in the closed position to thereby melt the solvent and form a melt liquid, a fourth step of supplying heat to the melt liquid while the first valving means is in the open position to thereby vaporize the melt liquid, and form a second vapor whose pressure is higher than the triple point pressure of the solvent and a fifth step of admitting the second vapor into Zone 1 to establish a heat exchange relation between the second vapor and the first condensed mass formed in the first step to thereby condense the second vapor and thaw the first condensed mass.

* * * * *